United States Patent [19]
Lins et al.

[11] Patent Number: 5,988,964
[45] Date of Patent: Nov. 23, 1999

[54] DRIVE-IN DOWEL

[75] Inventors: Reinhard Lins, Sevelen, Switzerland; Erich Wisser, Bregenz, Austria; Helmut Gassner, Triesenberg, Liechtenstein; Susanne Kossian, Feldkirch, Austria; Michael Werner, Munich, Germany

[73] Assignee: Hilti Aktiengesellschaft, Schaan, Liechtenstein

[21] Appl. No.: 09/159,529

[22] Filed: Sep. 23, 1998

[30] Foreign Application Priority Data

Oct. 10, 1997 [DE] Germany .................. 197 44 727

[51] Int. Cl.$^6$ .................. F16B 13/04; F16B 13/06
[52] U.S. Cl. .................. 411/30; 411/54.1; 411/57.1
[58] Field of Search .................. 411/30, 31, 45, 411/54, 60, 358, 359, 54.1, 57.1

[56] References Cited

U.S. PATENT DOCUMENTS

| | | | |
|---|---|---|---|
| 2,171,985 | 9/1939 | Mushet | 411/31 |
| 3,965,794 | 6/1976 | Dorgnon | 411/54 |
| 4,929,134 | 5/1990 | Bergner | 411/30 |
| 5,332,346 | 7/1994 | Shinjo | 411/54 X |
| 5,807,049 | 9/1998 | Beck et al. | 411/31 |
| 5,816,760 | 10/1998 | Mattner et al. | 411/31 X |

*Primary Examiner*—Neill Wilson
*Attorney, Agent, or Firm*—Brown & Wood

[57] ABSTRACT

A drive-in dowel including an inner sleeve (2) having a load application element (3), a cone-shaped widening section (5) formed at a front, in a setting direction (S), end of the inner sleeve (2), and a substantially cylindrical support section (6) adjoining the cone-shaped widening section (5) and having an outer diameter (w) which is smaller than a largest diameter (d) of the cone-shaped widening section (5), and an outer sleeve (7) arranged coaxially with the inner sleeve (2) and having, in its front, in the setting direction (s), region, a plurality of expansion tabs (8) separated from each other by longitudinal slots and radially expandable upon the outer sleeve (7) being impact driven over the cone-shaped widening section (5) of the inner sleeve (2), with the expansion tabs (8) being provided with annularly arranged, chisel-like cutters (11).

10 Claims, 1 Drawing Sheet

DRIVE-IN DOWEL

BACKGROUND OF THE INVENTION

1. Field of the Invention

The present invention relates to a drive-in dowel including an inner sleeve having load application means, preferably, in a form of an inner thread, and a cone-shaped widening section formed at a front, in a setting direction, end of the inner sleeve and an outer sleeve arranged coaxially with the inner sleeve, and having, in a front, in the setting direction region thereof, a plurality of expansion tabs separated from each other by longitudinal slots and radially expandable upon the outer sleeve being impact driven over the cone-shaped widening section of the inner sleeve.

2. Description of the Prior Art

Anchoring of conventional drive-in dowels is based primarily on an expansion principle. The used percussion or impact-driven expansion dowels are primarily formed of two parts and includes, e.g., a sleeve-shaped dowel body with a conical bore and a spreading member. In order to anchor the dowel in a prepared bore, the spreading member is percussion driven into the expandable region of the sleeve-shaped dowel. This causes expansion of the expandable region and a force-locking connection of the radially expanded expandable region of the dowel with the bore wall. However, the multi-part construction of the known dowel can cause several problems. E.g., the spreading member can be incorrectly inserted in the dowel body bore. Also, the spreading member can fall out of the bore and become lost. Further, with the spreading member being arranged and held outside of the dowel body bore, it can happen that upon a miss, the spreading member becomes inclined and would wedge.

The prior art discloses also a driven-in dowel the anchoring of which in a bore of a structural component is effected by axial displacement of two concentrically arranged sleeves. Thus, U.S. Pat. No. 2,171,985 discloses a percussion driven expansion dowel formed of an inner sleeve having an inner thread and supported against a bore bottom and an expansion sleeve displaceable over the inner sleeve. In the front end region of the inner sleeve, there is provided a section conically widening in a setting direction. The expansion sleeve has a plurality of expansion tabs separated by longitudinal slots from each other. The expansion tabs expand radially upon the expansion sleeve being percussion driven over the conical section of the inner sleeve. The anchoring of the expansion dowel is effected as a result of application of an expansion force which is imparted by the radially expanded expansion tabs to the bore wall.

The anchoring in accordance with expansion principle requires application of a high expansion force. This leads to large distances between axes and edges of formed attachment points. Because these distances not always can be maintained, there are provided systems, which are based on expandable drive-in dowels and which are anchored in bores of structural components as a result of a form-locking connection. Such systems make use of undercuts which are usually formed in the region of a bore bottom. The anchoring is effected with expansion tabs which are provided on a sleeve-shaped dowel body and which expand radially into an undercut, forming a form-locking connection. In many cases, in which form-lockingly anchoring undercut systems are used, it is often necessary to form an undercut at an exactly predetermined depth in a separate step with a special tool. Only after an undercut is formed in a bore wall, an undercut dowel can be inserted in the bore and form-lockingly anchored by percussion driving the expansion tabs over the sleeve cone section.

Also known are undercut self-cutting systems with which an undercut-forming dowel when being percussion driven into a bore, automatically forms an undercut by tangentially shaving the wall material. The known undercut self-cutting systems permit to obtain, within acceptable time limits, a form-locking connection. However, such undercut self-cutting systems can be used in small load application regions, with tensile loads less than 20 kN. As an alternative to the undercut self-cutting systems, undercut pressing dowels are used which represent an intermediate stage between percussion driven expansion dowels and undercut self-cutting dowel. With the undercut pressing dowels, the expansion elements, upon their radial expansion, are pressed into a form-locking engagement with a bore wall. The undercut pressing dowels form a form-locking engagement by volumetric displacement or repression. However, for an impressed depth greater than 1 mm, the necessary pressure force disproportionally increases. This is because the force increases at least in a square degree in comparison with a displaced volume. This leads to a destruction of the bore wall material and to degradation of the initial rigidity of the undercut pressing dowel. At a pressed-in depth of about 5 mm, cracks in concrete can be formed which substantially reduces the load bearing capability of a dowel.

Accordingly, an object of the present invention is to eliminate or at least substantially reduce the drawback of the prior art drive-in dowels. Another object of the present invention is to provide a drive-in dowel which can be easily form-lockingly anchored in a structural component. Expensive undercut-forming special tools should be eliminated. The energy consumption necessary for effecting anchoring should be relatively small and should be obtainable with axial impacts with a hammer. Further, forming undercuts with a depth of 5 mm and greater should be possible, without a disproportional increase of the energy consumption with increase of the undercut depth. The drive-in dowel should not form cracks or crevices in structural component and should have a secondary expansion capability. The drive-in dowel should also have a simple construction and be cost-effective. The drive-in dowel should further provide a user with an indication of when the anchoring has been obtained.

SUMMARY OF THE INVENTION

These and other objects of the present invention, which will become apparent hereinafter, are achieved by providing a drive-in dowel including an inner sleeve having load application means, in particular, in form of an inner thread, and having a cone-shaped widening section formed at a front, in a setting direction, end of the inner sleeve, and a substantially cylindrical support section adjoining the cone-shaped widening section and having an outer diameter which is smaller than a largest diameter of the cone-shaped widening section. The dowel further has an outer sleeve arranged coaxially with the inner sleeve and having, in a front, in the setting direction region thereof, a plurality of expansion tabs separated from each other by longitudinal slots. The expansion tabs expand radially upon the outer sleeve being impact driven over the cone-shaped widening section of the inner sleeve. The expansion tabs are provided with annularly arranged, chisel-like cutters. The chisel-like cutters, which are provided at front ends of the expansion tabs, remove the material of a bore wall with each hammer strike. Because the outer diameter of the support section is smaller than the outer diameter of the cone-shaped widening section, the chiseled-off material can fall on the bore bottom.

In this way, it is not displaced further by further radial expansion of the expansion tabs and/or comminuted by being pressed and, thus, does not prevent further chiseling-off of the wall material. The chisel-like cutters are substantially annularly arranged and engage the bore wall along the entire circumference of the outer sleeve. The longitudinal slots, which separate the expansion tabs, form only minimal interruptions between the annularly arranged cutters. Thereby, the wall material is chiseled off in a shell form.

Advantageously, the axial length of the support section amounts to from about two times to five times the wall thickness of the outer sleeve. Therefore, sufficient space is provided beneath the conically widening section of the inner sleeve for the annularly chiseled-off material of the bore wall. The chisel-like cutters engage the bore wall only linearly. Therefore, the energy consumption also increases linearly with increase of the undercut depth during forming of the undercut From the manufacturing point of view, it is advantageous when the outer diameter of the support section corresponds to the outer diameter of the inner sleeve in its region adjoining the conically widening section. The conically widening section can be produced, e.g., by upsetting the front region of the inner sleeve.

For better guidance of the drive-in dowel during its insertion in the bore, the outer sleeve is formed with an outer diameter corresponding to the largest diameter of the conically widening section.

The conically widening section of the inner-sleeve has a length amounting to from about two times to about four times the wall thickness of the outer sleeve and has an average approach angle from 15° to 60°. With a drive-in dowel having the above-mentioned parameters, undercuts, the depth of which amounts to about the wall thickness of the outer sleeve to two times the wall thickness, can be produced. With these undercut dimensions, the energy consumption remains moderate and can be obtained by axially impacting the rear end of the outer sleeve which, in initial condition, projects beyond the rear end of the inner sleeve. The expansion tabs have preferably a length amounting to from about two times to four times the wall thickness of the outer sleeve. At this length and the wall thickness of the outer sleeve from 1 mm to 3 mm, it is insured that the expansion tabs do not become deformed during chisel-forming of the undercut. In addition, with the expansion tabs or particularly the cutter regions, the wall can be hardened.

The chisel-like cutters, which are mounted on the expansion tabs, are limited, respectively, by a free surface and a chisel surface forming with each other a cutting angle from about 30° to about 90°. The free surface coincides with an outer surface of a respective expansion tab and the chisel surface extends toward the inner surface of the respective tab. With the selected cutting angle, good cutting characteristics of the cutters are obtained, without a danger of the cutters becoming deformed when a tensile load is applied to the dowel.

The free surface is inclined toward the longitudinal axis of the outer sleeve at a chisel angle from about 120° to about 175°. The inclination angle of the free surface and the cutting angle insure that a chisel force is directed into the bore wall, and that the force-receiving surfaces, which are parallel to the chisel direction, are not damaged. After being worked the concrete can still withstand high surface pressures when a tensile load is applied to the dowel.

To achieve a most possible conformity of the cutting curve course circumscribed by cutters with a tractrix, which is circumscribed by outer regions of the expansion tabs adjoining the cutters, the outer surfaces of the expansion tabs are formed as to toric concave or saddle-shaped surfaces. As a result of such profile of the outer surfaces of the expansion tabs, a most favorable flat abutment of the expansion tabs to the surface of the undercut is obtained when the dowel is subjected to a tensile load. In this way, a local surface pressure remains relatively small.

BRIEF DESCRIPTION OF THE DRAWINGS

The features and objects of the present invention will become more apparent, and the invention itself will be best understood from the following detailed description for the preferred embodiments when read with reference to the accompanying drawings, wherein.

DETAILED DESCRIPTION OF THE PREFERRED EMBODIMENT

Figure 1:
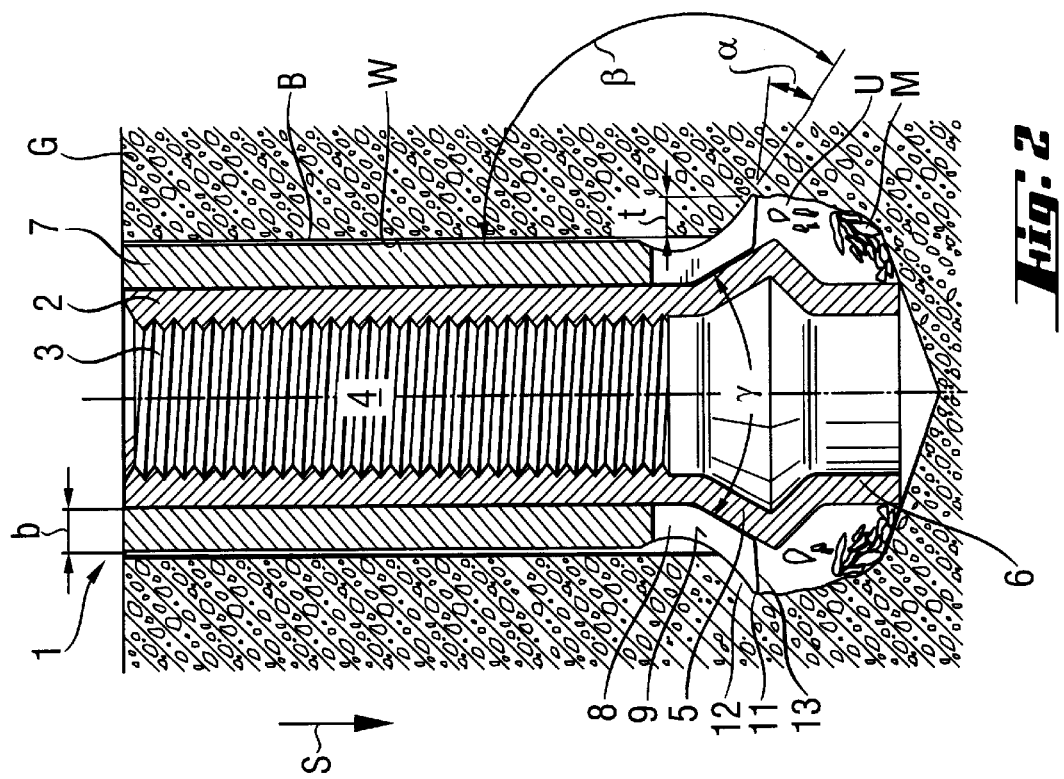
FIG. 1 shows an axial cross-sectional view of drive-in dowel according to the present invention in its initial position.
Figure 2:
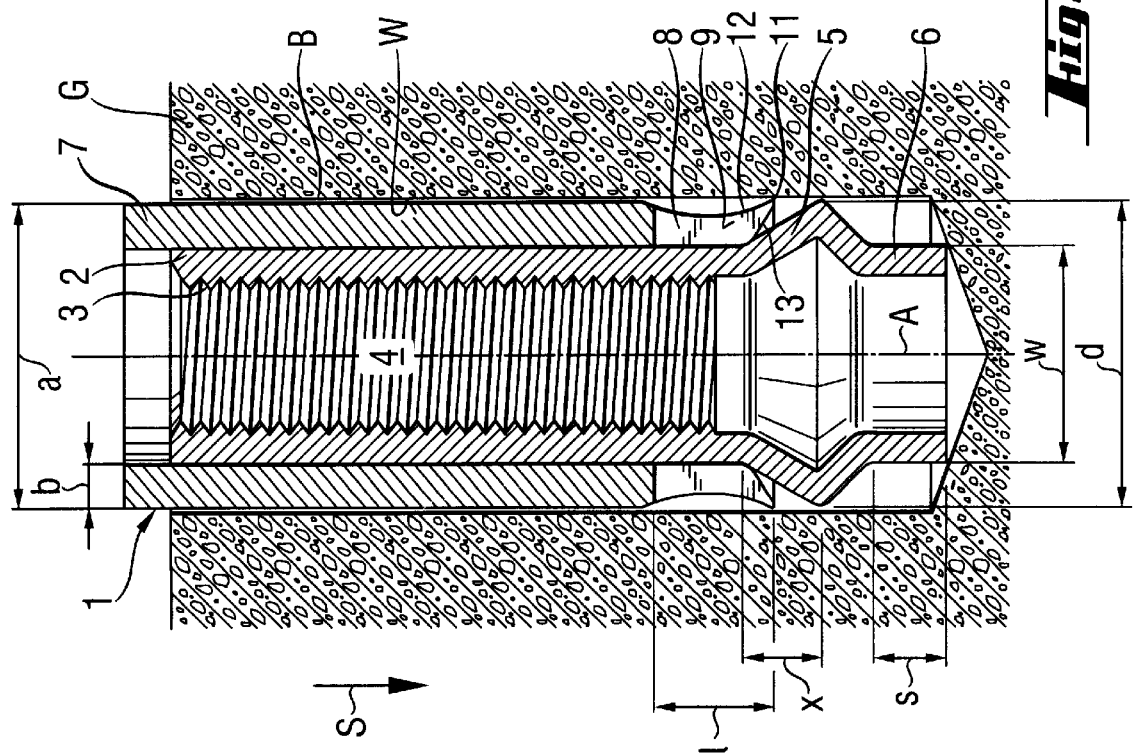
FIG. 2 shows an axial cross-sectional view of the drive-in dowel shown in FIG. 1 in its setted position.

A drive-in dowel according to the present invention, which is shown in FIGS. 1–2, is generally designated with a reference numeral 1. FIG. 1 shows the dowel 1 in its initial position, before anchoring. The dowel 1 is inserted in a bore 1 formed in a structural component, e.g., concrete or brick work. FIG. 2 shows the dowel 1 in its setted or anchored position. The drive-in dowel 1 has a sleeve 2 and a concentrically arranged with sleeve 2, outer sleeve 7. The inner sleeve 2 has a through-bore 4 provided with an inner thread 3 which extends along a larger portion of the longitudinal extent of the bore 4. The inner sleeve 2 has, in its front, viewing in a setting direction S, region, a cone-shaped widening section 5. As shown in FIG. 2, the cone-shaped widening section 5 forms with axis A of the inner sleeve 2 an average approach angle γ lying in a range from 15° to 60°. The axial length of the section 5, which is measured from a base of the section 5 to its largest diameter, is designated with X and amounts to about from one time to two times the wall thickness b of the outer sleeve 7. The wall thickness b of the outer sleeve 7 amounts to usually from about 1 mm to about 3 mm. A support section 6 adjoins the cone-shaped widening sections. The outer diameter w of the support section 6 is smaller than the largest diameter d of the section 5. For manufacturing reasons, the outer diameter W of the support section 6 is selected to be approximately equal to the outer diameter of the sleeve 2 measured before the cone-shaped widening section 5. The axial length s of the support section 6 amounts to from about two times to about five times the wall thickness b of the outer sleeve 7.

The outer sleeve 7 is arranged coaxially to the inner sleeve 2 and is axially displaceable toward the inner sleeve 2. The outer diameter a of the outer sleeve 7 corresponds approximately to the largest diameter d of the cone-shaped widening section 5 of the inner sleeve 2. In its front, in the setting direction S, region, the outer sleeve 7 has expansion tabs 8 separated from each other with longitudinal slots. The expansion tabs 8 are driven over the cone-shaped widening section 5 of the inner sleeve 2 upon subjecting the rear end of the outer sleeve 7 to axial impacts. To this end, in the region of rear ends of the longitudinal slots, which separate the expansion tabs, there are provided flexible hinges 9. At the opposite front ends of the expansion tabs 8, there are provided chisel-like cutters 11 arranged to form a ring, with the cutters 11 being separated from each other by the longitudinal slots. Each chisel-like cutter 11 is limited, as shown in FIG. 2, by a free surface 12 which coincides with an outer side of a respective expansion tab 8 and a chisel surface 13, which forms with the free surface 12 an angle α amounting to from about 30° to about 90°. The free surface 12 is inclined outwardly with respect to the axis A by a wedge angle β from about 120° to about 175°. To provide for better conformity of the cutting curve which is circumscribed by the cutters 11 upon radial expansion of the expansion tabs 8, with a tractrix, which is circumscribed by outer regions of the expansion tabs 8 adjoining the cutters 11, the outer surfaces of the expansion tabs are formed as toric concave or saddle-shaped surfaces.

Before start of a setting process, the outer sleeve 7 projects beyond the rear end surface of the inner sleeve 2 by a length corresponding to a length of a displacement path of the outer sleeve 7 necessary to achieve a complete expansion of tabs 8. For anchoring the drive-in dowel 1, the rear end surface of the outer sleeve 7 is subjected to axial impacts, e.g., by being stricken with a hammer. At that, the outer sleeve 7 rides over the cone-shaped widening section 5 of the inner sleeve 2 which is supported against a bottom of the bore B formed in a structural component G. Upon being expanded, the expansion tabs 8 are pressed against the wall W of the bore B. The ring-shaped cutters 11, provided at the front ends of the expansion tabs 8, cut into bore wall W upon each impact and remove the chiseled material away. The approach angle γ and the inclination angle β of the free surface so guide the chisel force into the bore wall in that the material is chiseled off in an annular manner. The chiseled-off material falls onto the bottom of a free space defined by the support section 5, as shown in FIG. 2. As soon as the rear end surfaces of both the inner and outer sleeves 2 and 7 are aligned, the setting process ends, with an undercut U, having a desired undercut depth t, is formed. The alignment of the rear end surfaces of the outer and inner sleeves 7 and 2 represents a simple way of controlling the setting process by an operator. In order to be able to reliably obtain a predetermined depth t, preferably, the axial length s of the support section 6 is selected so that it exceeds the predetermined depth t of the undercut in two or more times.

Though the present invention was shown and described with references to the preferred embodiments, various modifications thereof will be apparent to those skilled in the art and, therefore, it is not intended that the invention be limited to the disclosed embodiments or details thereof, and departure can be made therefrom within the spirit and scope of the appended claims.

What is claimed is:

1. A drive-in dowel, comprising an inner sleeve (2) having load application means (3), a cone-shaped widening section (5) formed at a front, in a setting direction (S), end of the inner sleeve (2), and a substantially cylindrical support section (6) adjoining the cone-shaped widening section (5) and extending from the cone-shaped widening section (5) in the setting direction, toward a front end surface of the inner sleeve (2), the substantially cylindricall support surface (6) having an outer diameter (w) which is smaller than a largest diameter (d) of the cone-shaped widening section (5); and an outer sleeve (7) arranged coaxial with the inner sleeve (2) and having, in a front, in the setting direction (s) region thereof, a plurality of expansion tabs (8) separated from each other by longitudinal slots and radially expandable upon the outer sleeve (7) being impact driven over the cone-shaped widening section (5) of the inner sleeve (2), the expansion tabs (8) being provided with angularly arranged, chisel-like cutters (11).

2. A drive-in dowel according to claim 1, wherein the support section (6) has an axial length (s) amounting to about from two times to five times a wall thickness (b) of the outer sleeve (7).

3. A drive-in dowel according to claim 1, wherein the outer diameter (w) of the support section (6) corresponds to an outer diameter of the inner sleeve (2) in a rear region of the inner sleeve (2) adjourning the cone-shaped widening section (5).

4. A drive-in dowel according to claim 1, wherein the outer sleeve (7) has an outer diameter (a) which approximately corresponds to the largest diameter (d) of the cone-shaped widening section (5) of the inner sleeve (2).

5. A drive-in dowel according to claim 1, wherein the cone-shaped widening section (5) has an axial length (x) amounting to from about two times to four times a wall thickness (b) of the outer sleeve (7), and an average approach angle (γ) from about 15° to about 60°.

6. A drive-in dowel according to claim 5, wherein the expansion tabs (8) have a length (l) amounting to from about two times to four times the wall thickness (b) of the outer sleeve (7).

7. A drive-in dowel according to claim 1, wherein the chisel-like cutters (11) are limited, respectively, by a free surface (12) and a chisel surface (13) forming with each other a cutting angle (α) from about 30° to about 90°, and wherein the outer surface (12) coincides with an outer surface of a respective expansion tab (8) and the chisel surface (13) extends toward the inner surface of the respective tab (8).

8. A drive-in dowel according to claim 7, wherein an end portion of the free surface (12) adjacent to the chisel surface 13 is inclined toward a longitudinal axis (A) of the outer sleeve (7) at a wedge angle (β) from about 120° to about 175°.

9. A drive-in dowel according to claim 1, wherein an outer surface of an expansion tab (8) is formed as one of a concave surface shaped as an inner surface of a torus and a saddle-in surface.

10. A drive-in dowel according to claim 1, wherein the outer sleeve (7) has a wall thickness (b) from about 1 mm to about 3 mm.

\* \* \* \* \*